(12) United States Patent
Tiirola et al.

(10) Patent No.: US 11,576,174 B2
(45) Date of Patent: Feb. 7, 2023

(54) TDRA ENHANCEMENTS FOR 60 GHZ SCENARIO

(71) Applicant: Nokia Technologies OY, Espoo (FI)

(72) Inventors: Esa Tapani Tiirola, Oulu (FI); Kari Juhani Hooli, Oulu (FI); Timo Erkki Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 72 days.

(21) Appl. No.: 17/222,297

(22) Filed: Apr. 5, 2021

(65) Prior Publication Data

US 2022/0322341 A1     Oct. 6, 2022

(51) Int. Cl.
*H04W 72/04* (2009.01)
*H04L 1/18* (2006.01)
(Continued)

(52) U.S. Cl.
CPC ....... *H04W 72/0446* (2013.01); *H04L 1/1614* (2013.01); *H04L 1/1812* (2013.01); *H04W 72/1263* (2013.01)

(58) Field of Classification Search
CPC .......... H04W 72/0446; H04W 72/1263; H04L 1/1614; H04L 1/1812
See application file for complete search history.

(56) References Cited

U.S. PATENT DOCUMENTS

2019/0149365 A1   5/2019  Chatterjee et al.
2020/0313803 A1*  10/2020 Khoshnevisan ...... H04L 1/1854
(Continued)

FOREIGN PATENT DOCUMENTS

EP    3893568 A1  * 10/2021 .......... H04W 68/025
KR  20220079545 A  *  6/2022 ........ H04W 72/1289
(Continued)

OTHER PUBLICATIONS

'3rd Generation Partnership Project; Technical Specification Group Radio Access Network; NR; Physical layer procedures for data (Release 16)', 3GPP TS 38.214 V16.5.0, Mar. 30, 2021.
(Continued)

*Primary Examiner* — Chi H Pham
*Assistant Examiner* — Vladislav Y Agureyev
(74) *Attorney, Agent, or Firm* — Harness, Dickey & Pierce, P.L.C.

(57) ABSTRACT

In a system, apparatus, method, and non-transitory computer readable medium for implementing time domain resource allocation (TDRA) enhancements for use in a 60 GHz frequency range scenario, a user equipment (UE) device may be caused to, receive a time domain resource allocation (TDRA) table from a radio access network (RAN) node, the TDRA table including TDRA configuration information for at least one multi-slot TDRA, receive an indication regarding at least one multi-slot TDRA from the RAN node, receive at least one masking signal indication from the RAN node, the at least one masking signal indication including information corresponding to at least one scheduled transmission slot for at least one masking signal, determine whether to modify the multi-slot TDRA based on the received at least one masking signal indication, and perform multi-slot communication with the RAN node based on results of the determining whether to modify the multi-slot TDRA.

17 Claims, 10 Drawing Sheets

(51) Int. Cl.
*H04L 1/16* (2006.01)
*H04W 72/12* (2009.01)

(56) References Cited

U.S. PATENT DOCUMENTS

2021/0360680 A1* 11/2021 Nam .................... H04W 72/042
2022/0210820 A1* 6/2022 Tian ...................... H04L 5/0044
2022/0216944 A1* 7/2022 Muruganathan .. H04W 72/0446

FOREIGN PATENT DOCUMENTS

| WO | WO-2019021929 A1 * | 1/2019 | ........... H04L 1/1822 |
| WO | WO-2019137432 A1 * | 7/2019 | ............... H04B 7/26 |
| WO | WO-2020063782 A1 * | 4/2020 | ........... H04L 1/1812 |
| WO | WO-2020/206083 A1 | 10/2020 | |
| WO | WO-2020224969 A1 * | 11/2020 | ........... H04L 1/1812 |
| WO | WO-2020260590 A1 * | 12/2020 | ........ H04W 72/1289 |
| WO | WO-2021001134 A1 * | 1/2021 | .......... H04W 72/042 |
| WO | WO-2021089387 A1 * | 5/2021 | |
| WO | WO-2021213267 A1 * | 10/2021 | |

OTHER PUBLICATIONS

International Search Report and Written Opinion dated May 31, 2022 issued in corresponding international patent application No. PCT/FI2022/050147.

* cited by examiner

| | SLIV1 | SLIV2 | SLIV3 | SLIV4 | SLIV5 | SLIV6 | SLIV7 | SLIV8 | ... | # of Slots |
|---|---|---|---|---|---|---|---|---|---|---|
| 0 | 1 | 1 | 1 | 1 | 1 | 1 | 1 | 1 | | 8 |
| 1 | 1 | 1 | 1 | 1 | 1 | 1 | 1 | | | 7 |
| 2 | | 1 | 1 | 1 | 1 | 1 | 1 | 1 | | 7 |
| 3 | 1 | 1 | 1 | 1 | 1 | 1 | | | | 6 |
| 4 | | 1 | 1 | 1 | 1 | 1 | 1 | | | 6 |
| 5 | | | 1 | 1 | 1 | 1 | 1 | 1 | | 6 |
| 6 | 1 | 1 | 1 | 1 | 1 | | | | | 5 |
| 7 | | 1 | 1 | 1 | 1 | 1 | | | | 5 |
| 8 | | | 1 | 1 | 1 | 1 | 1 | | | 5 |
| 9 | | | 1 | 1 | 1 | 1 | 1 | | | 5 |
| 10 | 1 | 1 | 1 | 1 | | | | | | 4 |
| 11 | | 1 | 1 | 1 | 1 | | | | | 4 |
| 12 | | | 1 | 1 | 1 | 1 | | | | 4 |
| 13 | | | | 1 | 1 | 1 | 1 | | | 4 |
| 14 | | | | | 1 | 1 | 1 | 1 | | 4 |
| 15 | 1 | 1 | 1 | | | | | | | 3 |
| 16 | | 1 | 1 | 1 | | | | | | 3 |
| 17 | | | 1 | 1 | 1 | | | | | 3 |
| 18 | | | | 1 | 1 | 1 | | | | 3 |
| 19 | | | | | 1 | 1 | 1 | | | 3 |
| 20 | | | | | | 1 | 1 | 1 | | 3 |
| 21 | 1 | 1 | | | | | | | | 2 |
| 22 | | 1 | 1 | | | | | | | 2 |
| 23 | | | 1 | 1 | | | | | | 2 |
| 24 | | | | 1 | 1 | | | | | 2 |
| 25 | | | | | 1 | 1 | | | | 2 |
| 26 | | | | | | 1 | 1 | | | 2 |
| 27 | | | | | | | 1 | 1 | | 2 |

TDRA ENHANCEMENTS FOR 60 GHZ SCENARIO

BACKGROUND

Field

Various example embodiments relate to methods, apparatuses, systems, and/or non-transitory computer readable media for providing time domain resource allocation (TDRA) enhancements for a 60 GHz frequency range scenario for communications between at least one user equipment (UE) device and at least one radio access network (RAN) node.

Description of the Related Art

A $5^{th}$ generation mobile network (5G) standard, referred to as 5G New Radio (NR), is being developed to provide higher capacity, higher reliability, and lower latency communications than the 4G long term evolution (LTE) standard. The 5G NR standard defines two frequency ranges of operation, e.g., Frequency Range (FR) 1 which includes sub-7.125 GHz frequency bands, and FR2 which includes frequency bands from 24.25 GHz to 52.6 GHz. Additionally, a proposal has been made to adapt the 5G standard to use the unlicensed 60 GHz frequency band, which includes frequency bands from 52.6 GHz to 71 GHz. The 60 GHz frequency band may be considered an extension to FR2, or a new FR (such as FR3).

SUMMARY

At least one example embodiment may be related to a user equipment (UE) device.

In at least one example embodiment, the UE device may include a memory storing computer readable instructions, and processing circuitry configured to execute the computer readable instructions to cause the UE device to, receive a time domain resource allocation (TDRA) table from a radio access network (RAN) node, the TDRA table including TDRA configuration information for at least one multi-slot TDRA, receive an indication regarding at least one multi-slot TDRA from the RAN node, receive at least one masking signal indication from the RAN node, the at least one masking signal indication including information corresponding to at least one scheduled transmission slot for at least one masking signal, determine whether to modify the multi-slot TDRA based on the received at least one masking signal indication, and perform multi-slot communication with the RAN node based on results of the determining whether to modify the multi-slot TDRA.

Some example embodiments provide that the TDRA table further includes a plurality of rows corresponding to individual TDRA configuration information, the individual TDRA configuration information including start and length indicator values (SLIV) information and mapping type information corresponding to the individual TDRAs of the respective row, and at least one row of the plurality of rows includes individual TDRAs for at least two contiguous time domain transmission slots, and the UE device may be further caused to perform a lookup operation on the TDRA table using the received indication, the indication identifying a row of the TDRA table.

Some example embodiments provide that the TDRA table further includes information related to scheduling multiple physical uplink shared channel (PUSCHs) transmission slots, scheduling multiple physical downlink shared channel (PDSCHs) transmission slots, or scheduling both multiple PUSCH transmission slots and multiple PDSCH transmission slots.

Some example embodiments provide that the UE device may be further caused to determine whether at least one transmission slot of the multi-slot TDRA overlaps with the at least one scheduled transmission slot for the at least one masking signal, and in response to the at least one transmission slot of the multi-slot TDRA overlapping the at least one scheduled transmission slot for the at least one mask signal, modify the multi-slot TDRA by, removing the overlapping transmission slot of the multi-slot TDRA, and removing a corresponding number of HARQ processes from the end of the multi-slot TDRA.

Some example embodiments provide that the UE device may be further caused to determine whether at least one symbol allocated for the at least one masking signal in the at least one scheduled transmission slot overlaps with at least one symbol indicated by a SLIV of the at least one slot of the multi-slot TDRA, and modify the multi-slot TDRA by changing the at least one symbol indicated by the SLIV of the overlapping multi-slot TDRA based on results of the determining whether the at least one symbol allocated for the at least one masking signal overlaps with the at least one symbol indicated by the SLIV.

Some example embodiments provide that the UE device may be further caused to determine a link direction of the at least one masking signal, and modify the multi-slot TDRA based on the determined link direction of the at least one masking signal conflicting with a link direction of the at least one slot of the multi-slot TDRA.

Some example embodiments provide that the UE device may be further caused to receive a replacement TDRA from the RAN node, and modify the multi-slot TDRA using the replacement TDRA based on results of the determining whether to modify the multi-slot TDRA.

Some example embodiments provide that the at least one masking signal indication indicates that at least one of a synchronization signal block (SSB) signal, a physical random access channel (PRACH) signal, a physical downlink control channel (PDCCH) monitoring signal, a channel state information reference signal (CSI-RS), a phase tracking reference signal (PTRS), a physical uplink control channel (PUCCH) signal, or any combinations thereof, are the at least one masking signal.

Some example embodiments provide that the UE device may be further caused to periodically receive the at least one masking signal indication from the RAN node, and the at least one masking signal indication includes a bitmap and each bit of the bitmap corresponding to a transmission slot or a symbol.

At least one example embodiment may be related to a radio access network (RAN) node.

In at least one example embodiment, the RAN node may include a memory storing computer readable instructions, and processing circuitry configured to execute the computer readable instructions to cause the RAN node to, transmit a time domain resource allocation (TDRA) table to at least one user equipment (UE) device, the TDRA table including TDRA configuration information for at least one multi-slot TDRA, transmit an indication regarding at least one multi-slot TDRA to the at least one UE device, transmit at least one masking signal indication to the at least one UE device, the at least one masking signal indication including information corresponding to at least one scheduled transmission slot for at least one masking signal, and perform multi-slot communication with the at least one UE device based on the at least one multi-slot TDRA and the at least one masking signal indication.

Some example embodiments provide that the TDRA table further includes information related to scheduling multiple physical uplink shared channel (PUSCHs) transmission slots, scheduling multiple physical downlink shared channel (PDSCHs) transmission slots, or scheduling both multiple PUSCH transmission slots and multiple PDSCH transmission slots.

Some example embodiments provide that the RAN node may be further caused to transmit a replacement TDRA to the at least one UE device, and perform the multi-slot communication with the at least one UE device using the multi-slot TDRA based on the replacement TDRA.

Some example embodiments provide that the RAN node may be further caused to periodically transmit the at least one masking signal indication to the at least one UE device, and wherein the at least one masking signal indication includes a bitmap and each bit of the bitmap corresponds to a transmission slot or a symbol.

At least one example embodiment may be related to a method of operating a UE device.

In at least one example embodiment, the method may include receiving a time domain resource allocation (TDRA) table from a radio access network (RAN) node, the TDRA table including TDRA configuration information for at least one multi-slot TDRA, receiving an indication regarding at least one multi-slot TDRA from the RAN node, receiving at least one masking signal indication from the RAN node, the at least one masking signal indication including information corresponding to at least one scheduled transmission slot for at least one masking signal, determining whether to modify the multi-slot TDRA based on the received at least one masking signal indication, and performing multi-slot communication with the RAN node based on results of the determining whether to modify the multi-slot TDRA.

Some example embodiments provide that the TDRA table further includes a plurality of rows corresponding to individual TDRA configuration information, the individual TDRA configuration information including start and length indicator values (SLIV) information and mapping type information corresponding to the individual TDRAs of the respective row, and at least one row of the plurality of rows includes individual TDRAs for at least two contiguous time domain transmission slots, and the method may further include performing a lookup operation on the TDRA table using the received indication, the indication identifying a row of the TDRA table.

Some example embodiments provide that the method may further include determining whether at least one transmission slot of the multi-slot TDRA overlaps with the at least one scheduled transmission slot for the at least one masking signal, and in response to the at least one transmission slot of the multi-slot TDRA overlapping the at least one scheduled transmission slot for the at least one mask signal, modifying the multi-slot TDRA by, removing the overlapping transmission slot of the multi-slot TDRA, and removing a corresponding number of HARQ processes from the end of the multi-slot TDRA.

Some example embodiments provide that the method may further include determining whether at least one symbol allocated for the at least one masking signal in the at least one scheduled transmission slot overlaps with at least one symbol indicated by a SLIV of the at least one transmission slot of the multi-slot TDRA, and modifying the multi-slot TDRA by changing the at least one symbol indicated by the SLIV of the overlapping multi-slot TDRA based on results of the determining whether the at least one symbol allocated for the at least one masking signal overlaps with the at least one symbol indicated by the SLIV.

Some example embodiments provide that the method may further include determining a link direction of the at least one masking signal, and modifying the multi-slot TDRA based on the determined link direction of the at least one masking signal conflicting with a link direction of the at least one slot of the multi-slot TDRA.

Some example embodiments provide that the method may further include receiving a replacement TDRA from the RAN node, and modifying the multi-slot TDRA using the replacement TDRA based on results of the determining whether to modify the multi-slot TDRA.

Some example embodiments provide that the method may further include periodically receiving the at least one masking signal indication from the RAN node, and wherein the at least one masking signal indication includes a bitmap and each bit of the bitmap corresponds to a transmission slot or a symbol.

At least one example embodiment may be related to a user equipment (UE) device.

In at least one example embodiment, the UE device may include means for receiving a time domain resource allocation (TDRA) table from a radio access network (RAN) node, the TDRA table including TDRA configuration information for at least one multi-slot TDRA, receiving an indication regarding at least one multi-slot TDRA from the RAN node, receiving at least one masking signal indication from the RAN node, the at least one masking signal indication including information corresponding to at least one scheduled transmission slot for at least one masking signal, determining whether to modify the multi-slot TDRA based on the received at least one masking signal indication, and performing multi-slot communication with the RAN node based on results of the determining whether to modify the multi-slot TDRA.

Some example embodiments provide that the TDRA table further includes a plurality of rows corresponding to individual TDRA configuration information, the individual TDRA configuration information including start and length indicator values (SLIV) information and mapping type information corresponding to the individual TDRAs of the respective row, and at least one row of the plurality of rows includes individual TDRAs for at least two contiguous time domain transmission slots, and the UE device may further include means for performing a lookup operation on the TDRA table using the received indication, the indication identifying a row of the TDRA table.

Some example embodiments provide that the TDRA table further includes information related to scheduling multiple physical uplink shared channel (PUSCHs) transmission slots, scheduling multiple physical downlink shared channel (PDSCHs) transmission slots, or scheduling both multiple PUSCH transmission slots and multiple PDSCH transmission slots.

Some example embodiments provide that the UE device may further include means for determining whether at least one transmission slot of the multi-slot TDRA overlaps with the at least one scheduled transmission slot for the at least one masking signal, and in response to the at least one transmission slot of the multi-slot TDRA overlapping the at least one scheduled transmission slot for the at least one mask signal, modifying the multi-slot TDRA by, removing the overlapping transmission slot of the multi-slot TDRA, and removing a corresponding number of HARQ processes from the end of the multi-slot TDRA.

Some example embodiments provide that the UE device may further include means for determining whether at least one symbol allocated for the at least one masking signal in one scheduled transmission slot overlaps with at least one symbol indicated by a SLIV of the at least one slot of the multi-slot TDRA, and modifying the multi-slot TDRA by changing the at least one symbol indicated by the SLIV of the overlapping multi-slot TDRA based on results of the determining whether the at least one symbol allocated for the at least one masking signal overlaps with the at least one symbol indicated by the SLIV.

Some example embodiments provide that the UE device may further include means for determining a link direction of the at least one masking signal, and modifying the multi-slot TDRA based on the determined link direction of the at least one masking signal conflicting with a link direction of the at least one slot of the multi-slot TDRA.

Some example embodiments provide that the UE device may further include means for receiving a replacement TDRA from the RAN node, and modifying the multi-slot TDRA using the replacement TDRA based on results of the determining whether to modify the multi-slot TDRA.

Some example embodiments provide that the at least one masking signal indication indicates that at least one of a synchronization signal block (SSB) signal, a physical random access channel (PRACH) signal, a physical downlink control channel (PDCCH) monitoring signal, a channel state information reference signal (CSI-RS), a phase tracking reference signal (PTRS), a physical uplink control channel (PUCCH) signal, or any combinations thereof, are the at least one masking signal.

Some example embodiments provide that the UE device may further include means for periodically receiving the at least one masking signal indication from the RAN node, and the at least one masking signal indication includes a bitmap and each bit of the bitmap corresponding to a transmission slot or a symbol.

At least one example embodiment may be related to a radio access network (RAN) node.

In at least one example embodiment, the RAN node may include means for transmitting a time domain resource allocation (TDRA) table to at least one user equipment (UE) device, the TDRA table including TDRA configuration information for at least one multi-slot TDRA, transmitting an indication regarding at least one multi-slot TDRA to the at least one UE device, transmitting at least one masking signal indication to the at least one UE device, the at least one masking signal indication including information corresponding to at least one scheduled transmission slot for at least one masking signal, and performing multi-slot communication with the at least one UE device based on the at least one multi-slot TDRA and the at least one masking signal indication.

Some example embodiments provide that the TDRA table further includes information related to scheduling multiple physical uplink shared channel (PUSCHs) transmission slots, scheduling multiple physical downlink shared channel (PDSCHs) transmission slots, or scheduling both multiple PUSCH transmission slots and multiple PDSCH transmission slots.

Some example embodiments provide that the RAN node may further include means for transmitting a replacement TDRA to the at least one UE device, and performing the multi-slot communication with the at least one UE device using the multi-slot TDRA based on the replacement TDRA.

Some example embodiments provide that the RAN node may further include means for periodically transmitting the at least one masking signal indication to the at least one UE device, and wherein the at least one masking signal indication includes a bitmap and each bit of the bitmap corresponds to a transmission slot or a symbol.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
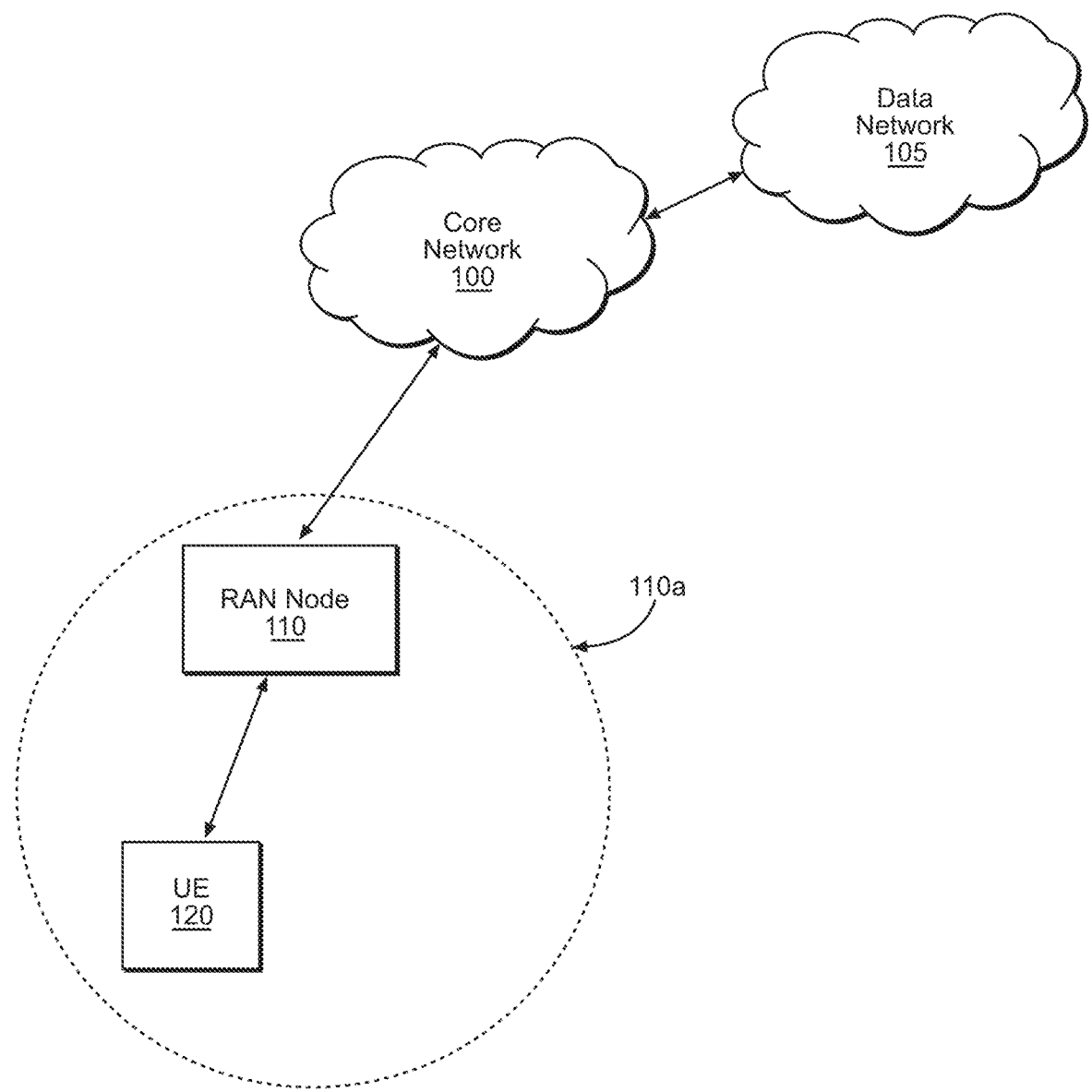
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc. Moreover, while the example embodiments are discussed with reference to the 60 GHz frequency range scenario (e.g., FR2 and/or FR2 extension scenarios, etc.), for the sake of clarity and convenience the example embodiments are not limited thereto and the example embodiments may also be applicable to other frequency ranges, such as sub-THz or THz range frequencies, etc.

Various example embodiments are directed towards enhancements to a time domain resource allocation (TDRA) for use with the 60 GHz frequency range scenario, and more specifically, enabling support for multiple-physical uplink shared channel (PUSCH) scheduling and/or multiple physical downlink shared channel (PDSCH) scheduling in the 60 GHz frequency range scenario. In the current 5G NR standard, a TDRA table is defined which supports multi-PUSCH scheduling only using a single DCI message, and does not support multiple PDSCH scheduling using a single DCI message and/or does not support both multiple PUSCH scheduling and multiple PDSCH scheduling (e.g., multi-PUSCH/PDSCH, multi-PxSCH, etc.) using a single DCI message, e.g., scheduling using a single DCI which has the capability of scheduling both uplink (UL) and downlink (DL) transport blocks (TBs), but where one TBs in one link direction are scheduled at a time, etc. Consequently, there is an increased overhead of signaling messages and/or processing required to allocate multiple DL TBs and/or physical resource blocks (PRBs) to a UE device due to the non-existence of support for multi-PDSCH scheduling and/or combined multi-PxSCH scheduling.

Accordingly, there is a desire to improve the TDRA table to further support the multi-PDSCH scheduling using a single DCI message and/or support both multi-PUSCH scheduling and multi-PDSCH scheduling using a single DCI message. While the example embodiments discuss the extension of the TDRA table in the context of the 60 GHz frequency range, the example embodiments are not limited thereto, and the extended TDRA table may also be used for other frequency range scenarios, such as FR1 and/or FR2, etc. Further, the TDRA table of at least one example embodiment provides additional benefits of decreasing the amount of memory required to store the TDRA table by reducing the number of TDRA table rows and/or RRC signals required to support non-contiguous slots in the TDRA table.

FIG. 1 illustrates a wireless communication system according to at least one example embodiment. As shown in FIG. 1, a wireless communication system includes a core network 100, and a Data Network 105, a first radio access network (RAN) node 110, a first user equipment (UE) device 120, but the example embodiments are not limited thereto and the example embodiments may include a greater or lesser number of constituent elements. For example, the wireless communication system may include a two or more UE devices, two or more RAN nodes, additional base stations, routers, access points, gateways, etc.

The RAN node 110 and/or the UE device 120 may be connected over a wireless network, such as a cellular wireless access network (e.g., a 3G wireless access network, a 4G-Long Term Evolution (LTE) network, a 5G-New Radio (e.g., 5G) wireless network, a WiFi network, etc.). The wireless network may include a core network 100 and/or a Data Network 105. The RAN node 110 may connect to each other and/or other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

According to some example embodiments, the RAN node 110 may act as a relay node (e.g., an integrated access and backhaul (IAB) node) and may communicate with the UE 120 in combination with at least one base station (and/or access point (AP), router, etc.) (not shown) of the same or a different radio access technology (e.g., WiFi, etc.). In at least one example embodiment, the RAN node 110 may perform outband relaying, wherein a base station (not shown) using a different radio access technology or a base station (not shown) operating at different frequency resources provides the access link (e.g., wireless communication) to the UE device 120, etc., or in other words, acts as an AP/gNB or a distributed unit (DU), and the base station connects to the RAN node 110 which facilitates at least one backhaul link to the core network 100, or in other words, acts as the IAB mobile termination (MT) entity. In the outband relaying example embodiment, the RAN node 110 may perform functionality associated with the UE device 120 discussed in the following figures. In at least one example embodiment, the RAN node 110 may perform inband relaying, wherein the RAN node 110 and the same frequency resources provide both the access link to the UE device 120 and the backhaul link, etc., or in other words, the RAN node 110 acts as both the IAB DU and the IAB MT. In these example embodiments, the functionality of the UE device 120 discussed in the following figures would be performed by a UE device, etc.

The UE device 120 may be any one of, but not limited to, a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to, for example, the 5G NR communication standard, and/or other wireless communication standard(s). The UE device 12/0 may be configurable to transmit and/or receive data in accordance to strict latency, reliability, and/or accuracy requirements, such as URLLC communications, TSC communications, etc., but the example embodiments are not limited thereto.

The wireless communication system further includes at least one RAN node (e.g., a base station, a wireless access point, etc.), such as RAN node 110, etc. The RAN node 110 may operate according to an underlying cellular and/or wireless radio access technology (RAT), such as 5G NR, LTE, Wi-Fi, etc. For example, the RAN node 110 may be a 5G gNB node, a LTE eNB node, or a LTE ng-eNB node, etc., but the example embodiments are not limited thereto. The RAN node 110 may provide wireless network services to one or more UE devices within a cell service area (e.g., a broadcast area, a serving area, a coverage area, etc.) surrounding the respective physical location of the RAN node, such as a cell service area 110A surrounding the RAN node 110, etc. For example, UE device 120 is located within the cell service area 110A, and may connect to, receive broadcast messages from, receive paging messages from, receive/transmit signaling messages from/to, and/or access the wireless network through, etc., RAN node 110 (e.g., the RAN node serving the UE device 120, etc.), but the example embodiments are not limited thereto.

Additionally, the RAN node 110 may be configured to operate in a multi-user (MU) multiple input multiple out (MIMO) mode and/or a massive MIMO (mMIMO) mode, wherein the RAN node 110 transmits a plurality of beams (e.g., radio channels, datastreams, streams, etc.) in different spatial domains and/or frequency domains using a plurality of antennas (e.g., antenna panels, antenna elements, an antenna array, etc.) and beamforming and/or beamsteering techniques.

The RAN node 110 may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system, such as access points, switches, routers, nodes, servers, gateways, etc.

Figure 2:
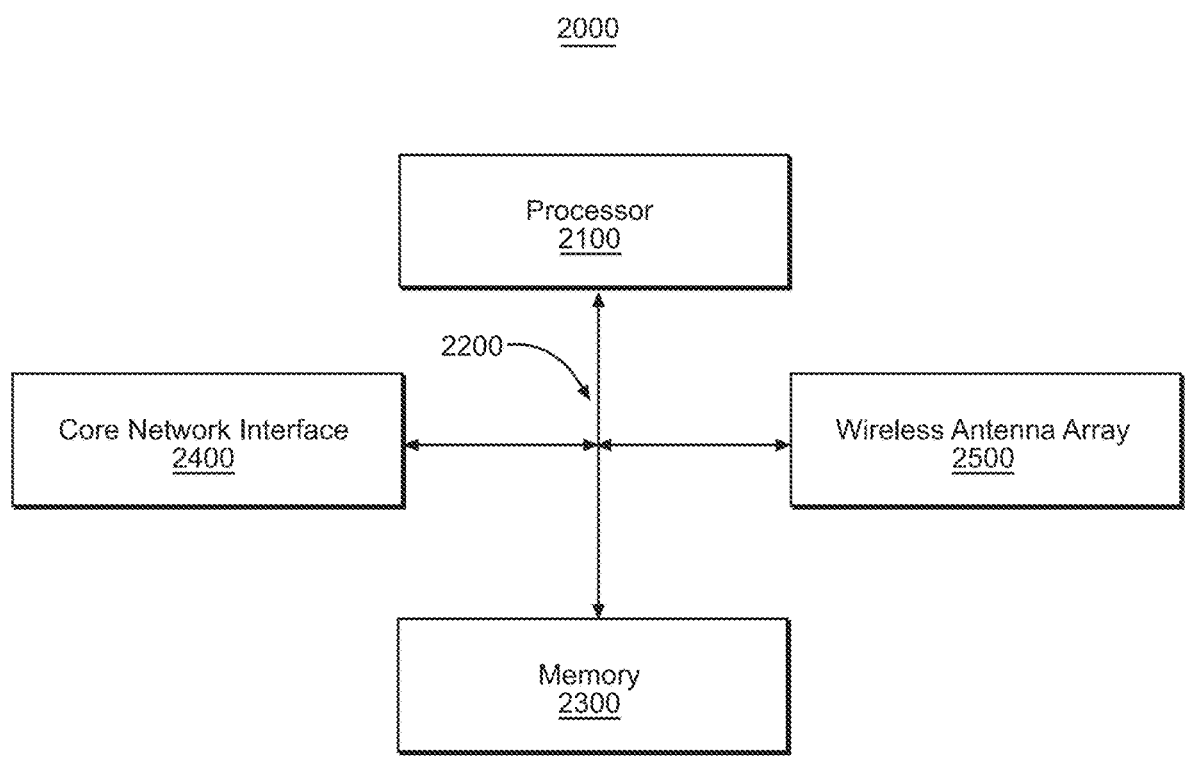
FIG. 2 illustrates a block diagram of an example RAN node according to at least one example embodiment.

FIG. 2 illustrates a block diagram of an example RAN node according to at least one example embodiment. The RAN node of FIG. 2 may correspond to the RAN node 110 of FIG. 1, but is not limited thereto.

Referring to FIG. 2, a RAN node 2000 may include processing circuitry, such as at least one processor 2100, at least one communication bus 2200, a memory 2300, at least one core network interface 2400, and/or at least one wireless antenna array 2500, etc., but the example embodiments are not limited thereto. For example, the core network interface 2400 and the wireless antenna array 2500 may be combined into a single network interface, etc., or the RAN node 2000 may include a plurality of wireless antenna arrays, a plurality of core network interfaces, etc., and/or any combinations thereof. The memory 2300 may include various special purpose program code including computer executable instructions which may cause the RAN node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIG. 6, the at least one core network interface 2400, and/or at least one wireless antenna array 2500, etc. Such software elements may be loaded from a non-transitory computer-readable storage medium independent of the memory 2300, using a drive mechanism (not shown) connected to the RAN node 2000, or via the at least one core network interface 2400, and/or at least one wireless antenna array 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

The RAN node 2000 may operate as, for example, a 4G RAN node, a 5G RAN node, etc., and may be configured to schedule time domain resource allocations (TDRAs), e.g., orthogonal frequency division multiplexing (OFDM) symbols, physical resource blocks (PRBs), resource elements, etc., for UE devices connected to the RAN node 2000, but the example embodiments are not limited thereto.

For example, the RAN node 2000 may allocate time-frequency resources of a carrier (e.g., resource blocks with time and frequency dimensions) based on operation on the time domain (e.g., time division duplexing) and the frequency domain (e.g., frequency division duplexing). In the time domain context, the RAN node 2000 will allocate a carrier (or subbands of the carrier) to one or more UEs (e.g., UE 120, etc.) connected to the RAN node 2000 during designated upload (e.g., uplink (UL)) time periods and designated download (e.g., downlink (DL)) time periods. When there are multiple UEs connected to the RAN node 2000, the carrier is shared in time such that each UE is scheduled by the RAN node 2000, and the RAN node 2000 allocates each UE with their own uplink time and/or downlink time. In the frequency domain context and/or when performing spatial domain multiplexing of UEs (e.g., MU MIMO, etc.), the RAN node 2000 will allocate separate frequency subbands of the carrier to UEs simultaneously served by the RAN node 2000, for uplink and/or downlink transmissions. Data transmission between the UE and the RAN node 2000 may occur on a radio frame basis in both the time domain and frequency domain contexts. The minimum resource unit for allocation and/or assignment by the RAN node 2000 to a particular UE device corresponds to a specific downlink/uplink time interval (e.g., one OFDM symbol, one slot, one minislot, one subframe, etc.) and/or a specific downlink/uplink resource block (e.g., twelve adjacent subcarriers, a frequency subband, etc.).

For the sake of clarity and consistency, the example embodiments will be described as using the time domain, but the example embodiments are not limited thereto.

Additionally, the RAN node 2000 may transmit scheduling information via physical downlink common channel (PDCCH) information to the one or more UE devices located within the cell servicing area of the RAN node 2000, which may configure the one or more UE devices to transmit (e.g., UL transmissions via physical uplink control channel (PUCCH) information and/or physical uplink shared channel information (PUSCH), etc.) and/or receive (e.g., DL transmissions via PDCCH and/or physical downlink shared channel information (PDSCH), etc.) data packets to and/or from the RAN node 2000. Additionally, the RAN node 2000 may transmit control messages to the UE device using downlink control information (DCI) messages via physical (PHY) layer signaling, medium access control (MAC) layer control element (CE) signaling, radio resource control (RRC) signaling, etc., but the example embodiments are not limited thereto.

The RAN node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one UE device, such as UE 120, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The RAN node 2000 may communicate with a core network (e.g., backend network, backhaul network, backbone network, Data Network, etc.) of the wireless communication network via a core network interface 2400. The core network interface 2400 may be a wired and/or wireless network interface and may enable the RAN node 2000 to communicate and/or transmit data to and from to network devices on the backend network, such as a core network gateway (not shown), a Data Network (e.g., Data Network 105), such as the Internet, intranets, wide area networks, telephone networks, VoIP networks, etc.

While FIG. 2 depicts an example embodiment of a RAN node 2000, the RAN node is not limited thereto, and may include additional and/or alternative architectures that may be suitable for the purposes demonstrated. For example, the functionality of the RAN node 2000 may be divided among a plurality of physical, logical, and/or virtual network elements, such as a centralized unit (CU), a distributed unit (DU), a remote radio head (RRH), and/or a remote radio unit (RRU), etc., but the example embodiments are not limited thereto. Additionally, the RAN node 2000 may operate in standalone (SA) mode and/or non-standalone (NSA) mode using interfaces (not shown) such as X2, Xn, etc., between the RAN node 2000 and other RAN nodes of the wireless network, interfaces, such as S1, NG, etc., between the RAN node 2000 and the core network (e.g., core network 100), interfaces between network functions of the RAN node 2000 operating in a distributed and/or virtual RAN mode (not shown), such as F1, E1, etc., and/or interfaces between the physical layer (e.g., a baseband unit, etc.) and the radio layer (e.g., a RRH, core network interface 2400, etc.) (not shown), such as CPRI, eCPRI, etc., but the example embodiments are not limited thereto.

Figure 3:
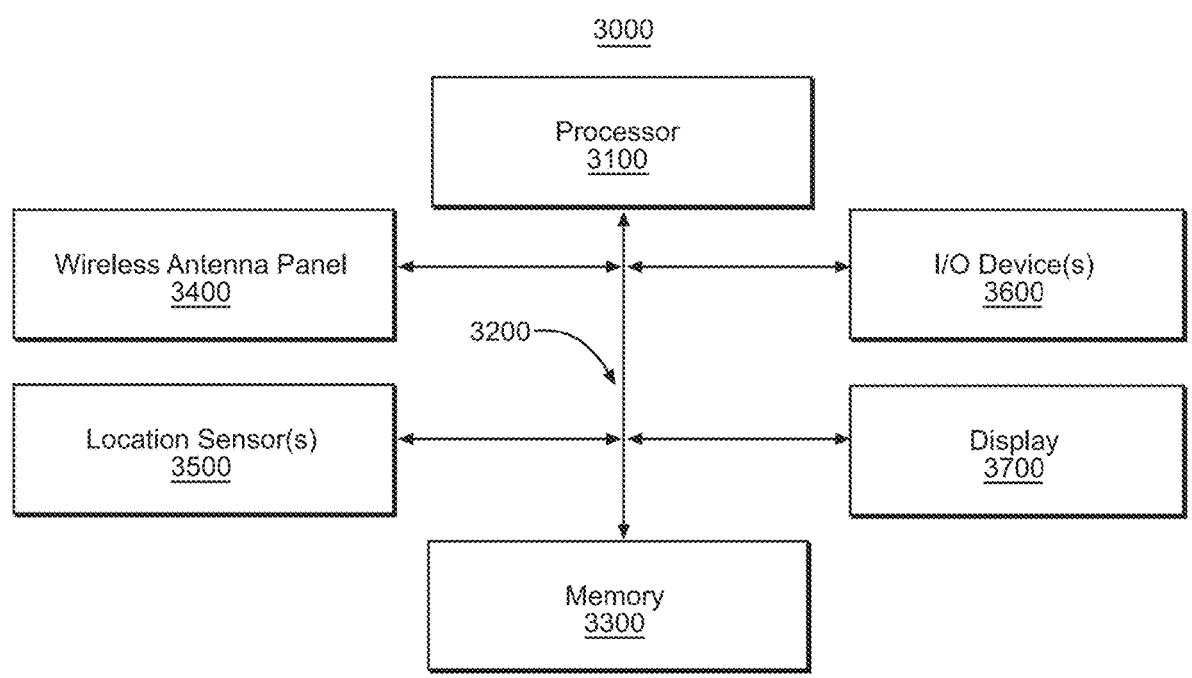
FIG. 3 illustrates a block diagram of an example UE device according to at least one example embodiment.

FIG. 3 illustrates a block diagram of an example UE device according to at least one example embodiment. The example UE device 3000 of FIG. 3 may correspond to the UE device(s) 120 of FIG. 1, but the example embodiments are not limited thereto.

Referring to FIG. 3, a UE 3000 may include processing circuitry, such as at least one processor 3100, at least one communication bus 3200, a memory 3300, a plurality of wireless antennas and/or wireless antenna panels 3400, at least one location sensor 3500, at least one input/output (I/O) device 3600 (e.g., a keyboard, a touchscreen, a mouse, a microphone, a camera, a speaker, etc.), and/or a display panel 3700 (e.g., a monitor, a touchscreen, etc.), but the example embodiments are not limited thereto. According to some example embodiments, the UE 3000 may include a greater or lesser number of constituent components, and for example, the UE 3000 may also include a battery, one or more additional sensors (e.g., thermometers, humidity sensors, pressure sensors, motion sensors, accelerometers, etc.), actuators, a single wireless antenna and/or a single wireless antenna panel, etc. Additionally, the location sensor 3500, the display panel 3700, and/or I/O device 3600, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIGS. 5A to 5E, the wireless antenna 3400, and/or the location sensor 3500, etc. Such software elements may be loaded from a non-transitory computer-readable storage medium independent of the memory 3300, using a drive mechanism (not shown) connected to the UE 3000, or via the wireless antenna 3400, etc. Additionally, the memory 3300 may store network configuration information, such as system information, resource block scheduling, a TDRA table, etc., for communicating with at least on RAN node, e.g., RAN node 110, etc., accessing a wireless network, etc., but the example embodiments are not limited thereto.

In at least one example embodiment, the at least one communication bus 3200 may enable communication and data transmission/reception to be performed between elements of the UE 3000. The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include at least one wireless antenna panel 3400, but is not limited thereto. The at least one wireless antenna panel 3400 may include at least one associated radio unit (not shown) and may be used to transmit wireless signals in accordance with at least one desired radio access technology, such as 4G LTE, 5G NR, Wi-Fi, etc. The at least one wireless antenna panel 3400 may be located at the same or different physical locations on the body of the UE 3000, may have the same or different orientations, may operate in the same or different frequency ranges, may operate in accordance with the same or different radio access technology, etc. According to some example embodiments, the at least one wireless antenna panel 3400 may be a single antenna, or may be a plurality of antennas, etc.

The UE 3000 may also include at least one location sensor 3500 to calculate the absolute and/or relative location of the UE 3000. The at least one location sensor 3500 may be a GNSS sensor, such as a GPS sensor, a GLONASS sensor, a Galileo sensor, a Beidou sensor, etc., an inertial movement sensors, such as a gyroscope, an accelerometer, an altimeter, etc. Additionally, the location sensor 3500 and/or the processor 3100 may also use cellular network based positioning services, such as a cellular network location service (e.g., a location management function (LMF) service of the core network), an Assisted-GPS (A-GPS) function, etc., to determine the current location of the UE 3000. In some example embodiments, the cellular network location service may also include a network based positioning solution, such as downlink time difference of arrival (DL-TDOA), an uplink time difference of arrival (UL-TDOA), an enhanced cell ID (E-CID), an uplink angle of arrival (UL-AoA), a downlink angle of departure (DL-AoD), a multi-cell round trip time (multi-RTT), etc., or any combination thereof. In some additional example embodiments, the cellular network location solution may also be run at the UE side (i.e., in UE based mode). However, the example embodiments are not limited thereto, and other location determining techniques may be used as well.

While FIG. 3 depicts an example embodiment of a UE 3000, the UE device is not limited thereto, and may include additional and/or alternative architectures that may be suitable for the purposes demonstrated.

Figures 4A, 4B:
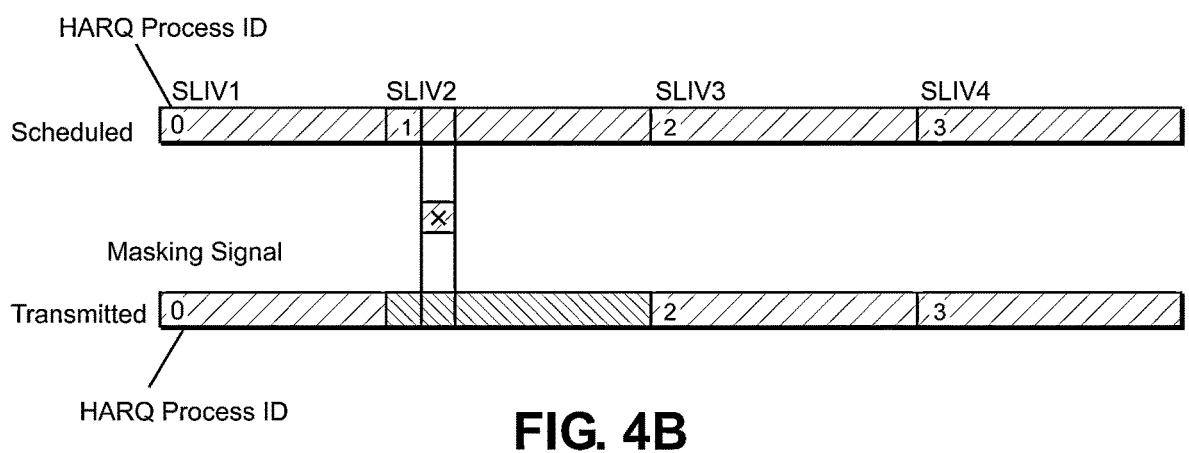
FIG. 4A illustrates an example enhanced TDRA table according to at least one example embodiment.
FIGS. 4B to 4D illustrate examples of masking signals overlapping with multi-slot TDRAs according to some example embodiments.
Figure 5A:
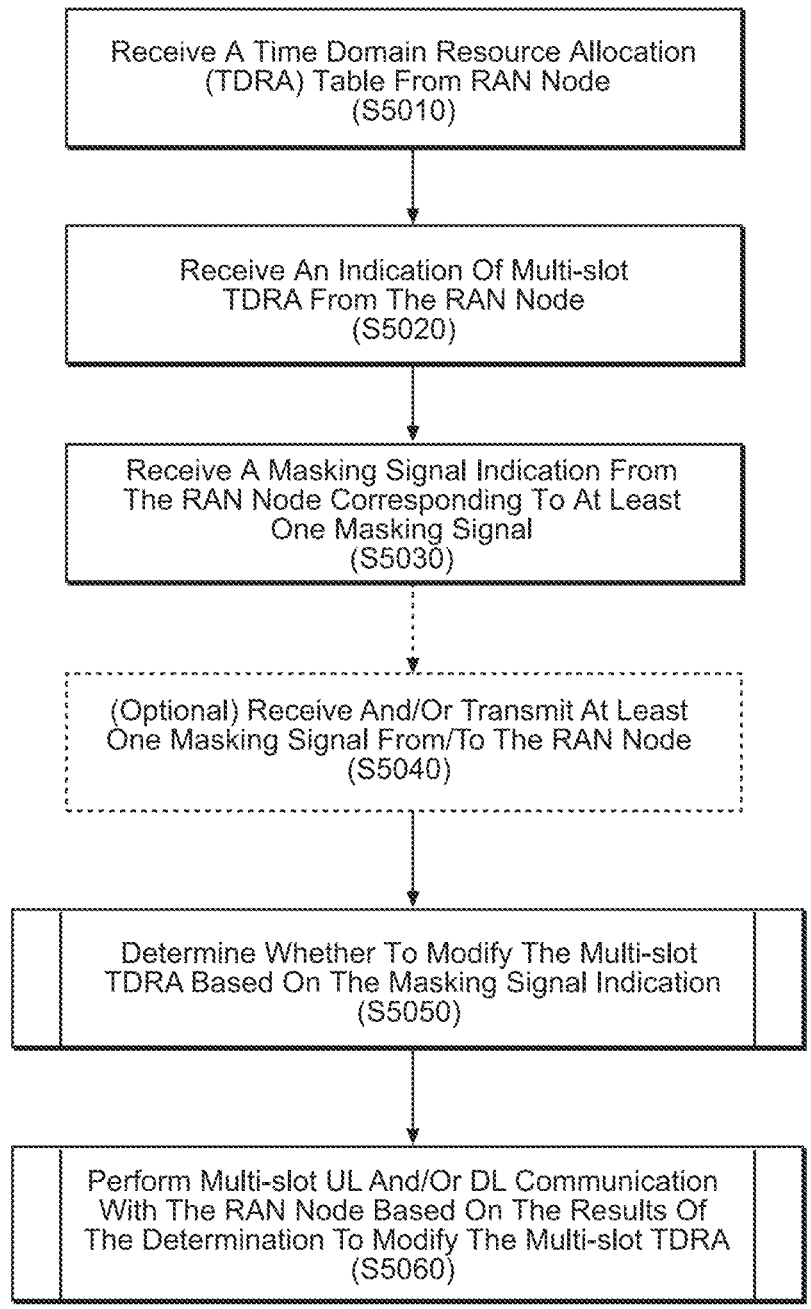
FIGS. 5A to 5E are example flowcharts illustrating methods of operating a UE device according to some example embodiments.

FIG. 4A illustrates an example enhanced TDRA table according to at least one example embodiment. FIG. 5A is an example flowchart illustrating a method of operating a UE device using the example enhanced TDRA table according to at least one example embodiment.

Referring now to FIGS. 4A and 5A, according to at least one example embodiment, in operation S5010, a UE device, such as UE device 120, may receive a TDRA table 4000 from a RAN node (e.g., a gNB node, an ng-eNB node, etc.), such as RAN node 110, but the example embodiments are not limited thereto. The TDRA table 4000 may be used by the UE device 120 to determine a multi-PxSCH scheduling assignment used to perform UL and/or DL communication that is provided by the RAN node 110, etc. However, the example embodiments are not limited thereto, and for example, the UE device 120 may be configured and/or pre-configured with the TDRA table 4000, and may instead receive at least one configuration signal from the RAN node 110 which triggers the UE device 120 to begin using the TDRA table, etc.

As shown in FIG. 4A, the TDRA table 4000 may include a plurality of rows (e.g., rows 0 to 27, etc.) and a plurality of columns (e.g., columns 1 to 8, etc.), but the example embodiments are not limited thereto, and for example, the TDRA table 4000 may include a greater or lesser number of rows and/or columns, etc. Each of the rows of the TDRA table 4000 may correspond to TDRA configuration information for at least one multi-slot TDRA which may be used to schedule multi-PUSCH transmission slots and/or schedule multi-PDSCH transmission slots, etc., in combination with an indication from the RAN node 110 determining the slot when the corresponding multi-PUSCH and/or multi-PDSCH transmission starts, but is not limited thereto, and each of the columns of the TDRA table 4000 may correspond to a different slot (or mini-slot, etc.), but is not limited thereto. As another example, the TDRA table 4000 may include SLIV values in each cell and the number of PDSCH/PUSCH slots may be separately indicated using an indication transmitted by the RAN node 110, etc., but the example embodiments are not limited thereto.

Moreover, according to at least one example embodiment, the TDRA table 4000 may exclude rows which correspond to empty columns, or in other words, the TDRA table 4000 does not include any rows including SLIV(s) where the UE device 120 is not scheduled to transmit and/or receive data, etc., but the example embodiments are not limited thereto.

Additionally, each of the columns may be associated with a desired (and/or defined) start and length indicator value (SLIV), which includes information indicating the contiguous OFDM/DFT-S-OFDM symbols carrying PDSCH or PUSCH in the corresponding cell, etc., and mapping type information (e.g., information whether the cell uses slot-based mapping type or mini-slot based mapping type) (not shown) for the cell, but the example embodiments are not limited thereto. According to some example embodiments, each individual cell of the TDRA table 4000 may be referred to as an individual TDRA and may correspond to a scheduling assignment for either a UL and/or DL transmission slot and/or transport block corresponding to a multi-PxSCH schedule for the UE device 120, etc., but the example embodiments are not limited thereto. Additionally, other information elements for use with and/or the TDRA table 4000 may be transmitted to the UE device 120 via DCI, such as a single HARQ process identifier (ID) field/information element for the first PDSCH/PUSCH that is scheduled using the DCI message as shown in FIG. 4B, and the UE device 120 increments the HARQ process ID for each subsequent PDSCH/PUSCH scheduled in accordance with the indicated row of the TDRA table 4000, etc., but the example embodiments are not limited thereto. The TDRA table 4000 may be used by the UE device 120 to determine a time domain resource allocation (e.g., TB scheduling assignment, etc.) for performing UL and/or DL communication with the RAN node 110.

While FIG. 4A illustrates a TDRA table with rows of contiguous slot assignments only, the example embodiments are not limited thereto, and for example, the rows may further include non-contiguous slot assignments as well, etc. Additionally, the example embodiments are not limited to a single TDRA table, and for example, a plurality of TDRA tables 4000 (e.g., separate TDRA tables for multi-PUSCH scheduling and multi-PDSCH scheduling, etc.) may be transmitted by the RAN node 110 to the UE device 120.

In operation S5020, the UE device 120 receives at least one indication of a multi-slot TDRA assignment from the RAN node 110 and uses the multi-slot TDRA indication to perform a lookup operation on the TDRA table 4000 and determine the multi-slot TDRA to which it has been assigned by the RAN node 110, as well as the corresponding TDRA configuration information (e.g., SLIV and mapping type information, etc.). For example, the UE device 120 may receive a multi-slot TDRA indication indicating that the UE device 120 has been assigned to perform UL or DL communication using row 0 of the TDRA table via PDCCH, but the example embodiments are not limited thereto, and for example, other signaling and/or messaging types may be used to transmit the multi-slot TDRA indication from the RAN node 110 to the UE device 120, etc. As shown in FIG. 4A, row 0 corresponds to a scheduling assignment of 8 contiguous slots for the UE device 120, with the first slot using desired (e.g., configured, defined, etc.) SLIV1 value, the second slot using desired SLIV2 value, up to the eighth slot using a desired SLIV8 value, etc., but the example embodiments are not limited thereto, and for example, and each column may be used with any desired SLIV value and/or mapping type value. For example, the SLIV1 value may include that a PDSCH or PUSCH corresponding to first slot starts from a desired OFDM/direct Fourier transform spread (DFT-S-OFDM) symbol, e.g., symbol #2, etc., and the desired duration length, e.g., the duration is 10 OFDM/DFT-S-OFDM symbols, etc., but the example embodiments are not limited thereto. Accordingly, based on the SLIV1 value, the UE device 120 may determine that the SLIV1 covers OFDM/DFT-S-OFDM symbols 2 through 11, etc. As a second example, row 27 may correspond to a scheduling assignment of two contiguous slots, wherein the UE device 120 is scheduled to communicate with the RAN node 110 during slots 7 and 8 only using SLIV7 and SLIV8 values and their corresponding mapping types, respectively, but the example embodiments are not limited thereto.

In operation S5030, the UE device 120 may receive at least one masking signal indication from the RAN node 110 via signaling from the RAN node 110, such as RRC signaling, unicast DCI message(s), and/or group-common physical downlink control channel (GC-PDCCH) messages, etc., wherein the at least one masking signal indication may correspond to at least one masking signal. In at least one example embodiment, the masking signal indication may be periodically received from the RAN node 110, e.g., the masking signal indication may correspond to a periodic signal, and therefore the masking signal indication is periodically transmitted by the RAN node 110, etc., but the example embodiments are not limited thereto. According to some example embodiments, the masking signal may correspond to a signal which has priority over the scheduled and/or allocated PUSCH and/or PDSCH communication between the UE device 120 and the RAN node 110. For example, the masking signal may correspond to one or more of a synchronization signal block (SSB) signal, a physical random access channel (PRACH) signal, a physical downlink control channel (PDCCH) signal, a channel state information reference signal (CSI-RS), a phase tracking reference signal (PTRS), a periodic (PUCCH) signal, etc., or any combinations thereof, but the example embodiments are not limited thereto.

Additionally, the masking signal indication may further include and/or indicate information related to the desired (e.g., defined, configured, etc.) OFDM symbols (e.g., symbols, etc.) allocated to the masking signal, the slot that the masking signal is allocated to, the masking signal type, and/or the periodicity of the masking signal, etc., but the example embodiments are not limited thereto. Further, according to some example embodiments, the masking signal indication may be transmitted with the granularity of a single slot (and/or a single OFDM symbol), and for example, the masking signal indication may be a bitmap with a duration of e.g. 40 bits, where for example, each bit in the bitmap corresponds to a slot or an OFDM symbol, and each bit set as '1' in the bitmap indicates that at least one masking signal is present in the corresponding slot/OFDM symbol, and each bit indicated as '0' indicates that masking signal is not present, or vice versa, but the example embodiments are not limited thereto.

Additionally, according to some example embodiments, when the masking signal indication is included in the SFI carried on the GC-PDCCH, the masking signal indication may be a symbol included in the SFI which is designated as a UL symbol or as a flexible UL/DL symbol (e.g., a symbol corresponding to a slot which may be either a UL or DL slot, etc.) when the corresponding allocated slot is a PDSCH transmission slot, or vice versa, when the symbol included in the SFI is designated as a DL symbol or as a flexible UL/DL symbol when the corresponding allocated slot is a PUSCH transmission slot, etc. Further, according to some example embodiments, the masking functionality may be triggered via DCI using a dedicated masking functionality signaling bit, but the example embodiments are not limited thereto, and for example, the masking functionality may be toggled on/off using a DCI message, etc. For example, if the UE device 120 receives a DCI message with the dedicated masking functionality signaling bit set, the UE device 120 may enable multi-PxSCH scheduling functionality according to one or more of the example embodiments, and may revert to legacy PxSCH functionality if the dedicated masking functionality signaling bit is not set, but the example embodiments are not limited thereto. Moreover, according to some example embodiments, the TDRA table 4000 may include some rows which enable multi-PxSCH scheduling functionality according to one or more of the example embodiments, and other rows in the TDRA table 4000 may correspond to legacy PxSCH operations, and the TDRA indication may be used to turn on/off the multi-PxSCH scheduling functionality, etc., but the example embodiments are not limited thereto.

In optional operation S5040, the UE device 120 may receive and/or transmit the at least one masking signal from and/or to the RAN node 110 during the slot designated in the at least one masking signal indicator received in S5030. However, the example embodiments are not limited thereto, and for example, the UE device 120 may neither transmit nor receive the masking signal during the slot designated by the at least one masking signal indicator, and the slot indicated for the masking signal may be a desired slot for use by other UE devices and/or the RAN node 110, etc. For example, the designated slot for the masking signal may be used by other RAN nodes to transmit PRACH, etc., to the RAN node 110, but the example embodiments are not limited thereto. According to some example embodiments, the at least one masking signal may be a periodic signal, but is not limited thereto. Further, according to some example embodiments, the masking signal may be received via RRC signaling, but is not limited thereto.

In operation S5050, the UE device 120 may determine whether to modify the initial multi-slot TDRA allocated by the multi-slot TDRA indication (e.g., received in operation S5020) by determining whether there is an overlap and/or conflict between the slots and/or symbols of the allocated (e.g., scheduled, assigned, etc.) TDRAs and the slots and/or symbols allocated to the masking signal as included in the masking signal indication. The overlap determination and modification of the multi-slot TDRA will be discussed in further detail in connection with FIGS. 5B to 5E.

Based on the results of the determination on whether to modify the multi-slot TDRA, in operation S5060, the UE device 120 may either communicate with the RAN node 110 using the initial (e.g., original) multi-slot TDRA allocation, or may communicate with the RAN node 110 using the modified multi-slot TDRA allocation.

Figure 5B:
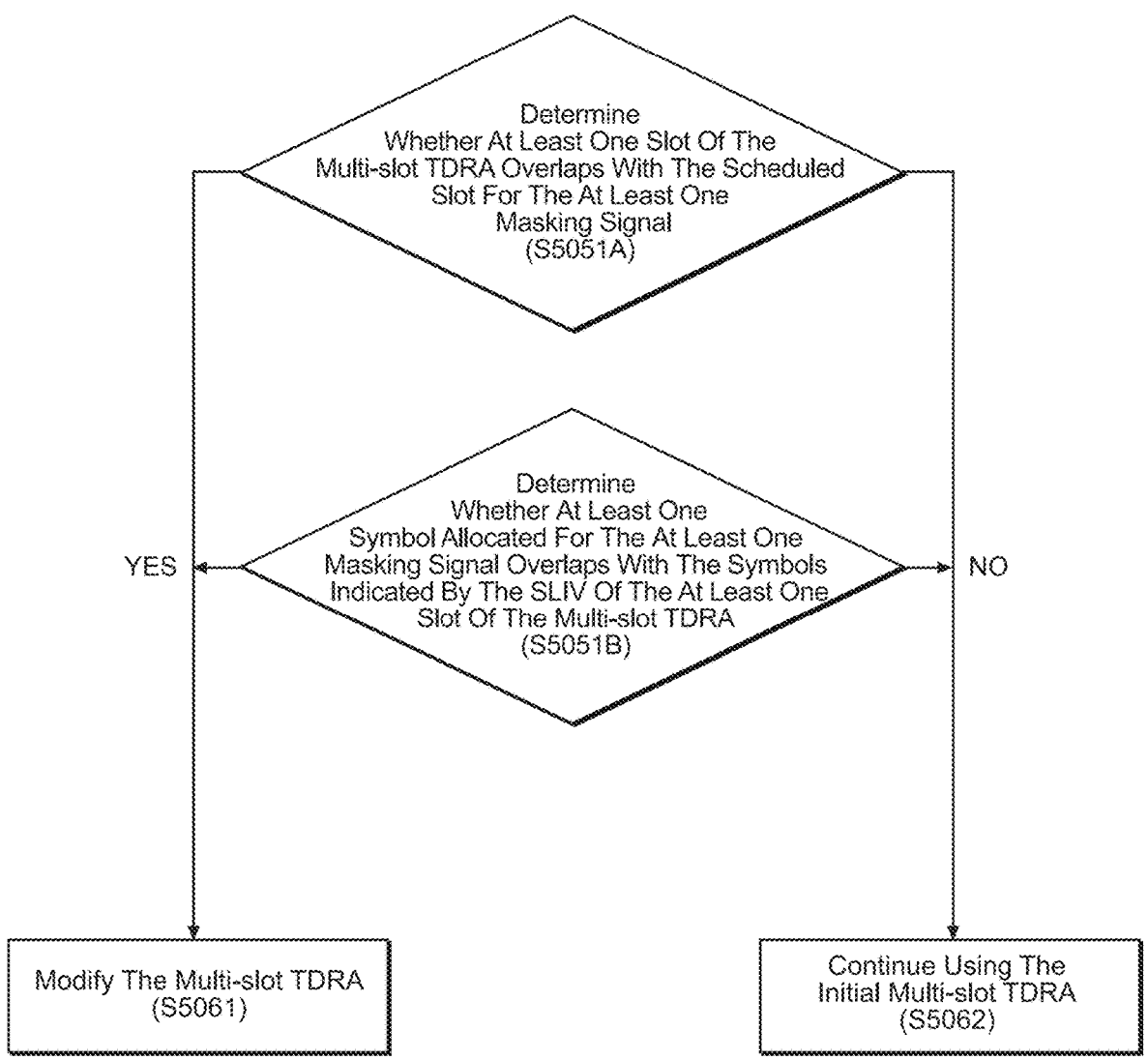

FIG. 4B illustrates a first example of a masking signal overlapping a multi-slot TDRA according to at least one example embodiment. FIG. 5B is an example flowchart illustrating a method of determining whether to modify an initial multi-slot TDRA according to at least one example embodiment.

Referring now to FIGS. 4B and 5B, according to some example embodiments, in operation S5051A, the UE device 120 may determine whether to modify the initial multi-slot TDRA by determining whether at least one slot of the multi-slot TDRA overlaps with (and/or conflicts with) the scheduled slot for the at least one masking signal as indicated by the corresponding masking signal indication. As shown in the example scenario of FIG. 4B, it is assumed that the UE device 120 has received a multi-slot TDRA indication indicating that the UE device 120 has been assigned to row 10 of the TDRA table 4000 of FIG. 4A. Additionally, the UE device 120 may have received a masking signal indication corresponding to masking signal X, which indicates that the slot designated for masking signal X is the slot corresponding to SLIV2 (e.g., corresponding to the slot with HARQ process ID 1). In response to the UE device 120 determining that there is an overlap and/or conflict between the multi-slot TDRA assignment and the scheduling of the masking signal X, in operation S5061, the UE device 120 may modify the multi-slot TDRA assignment.

For example, according to at least one example embodiment, the UE device 120 may modify the multi-slot TDRA to perform the PxSCH transmission/reception during the slots corresponding to SLIV1, SLIV3, and SLIV4, and drop (e.g., not perform the scheduled PUSCH transmission and/or the scheduled PDSCH reception) the overlapping and/or conflicting slot, e.g., the slot corresponding to SLIV2, in order to, e.g., receive and/or or transmit the priority masking signal X during the SLIV2, however the example embodiments are not limited thereto and other methods of modifying the multi-slot TDRA will be discussed in connection to FIGS. 5A to 5E. However, if the results of operation S5051A indicate that there is no overlap and/or conflict between the initial multi-slot TDRA assignment and the scheduled slot for the masking signal X, in operation S5062, the UE device 120 continues to use the initial multi-slot TDRA.

According to some example embodiments, in operation 55051B, the UE device 120 may alternatively determine whether there is an overlap and/or conflict between the OFDM symbols allocated in the initial multi-slot TDRA assignment and the OFDM symbol allocated for the masking signal X. If there is an overlap and/or conflict between the OFDM symbols of the initial multi-TDRA assignment and the masking signal X, then the UE device 120 may perform operation S5061 and modify the multi-slot TDRA assignment. If there is no overlap and/or conflict between the OFDM symbols of the initial multi-TDRA assignment and the masking signal X, the UE device 120 may continue to use the initial TDRA assignment (operation S5062).

Figure 4C:
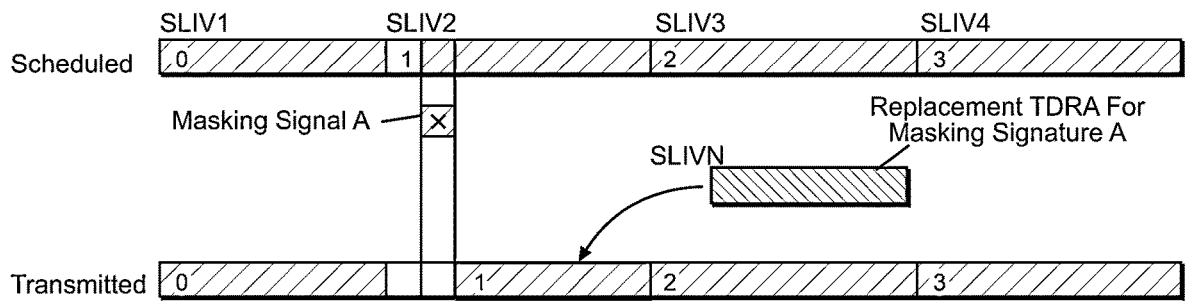
Figure 4D:
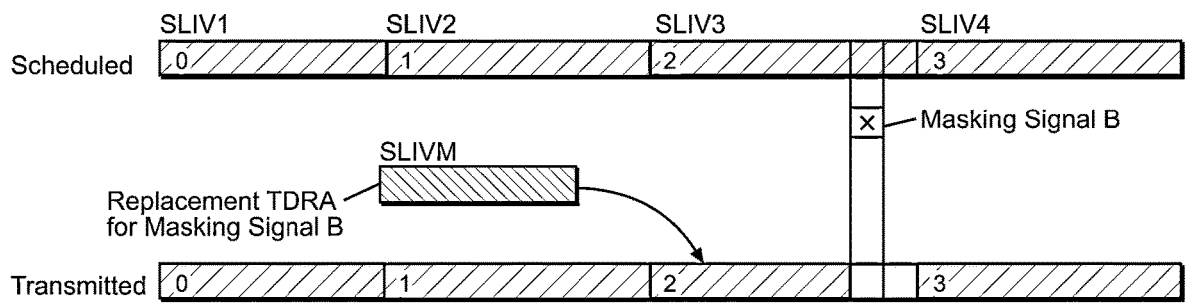
Figure 5C:
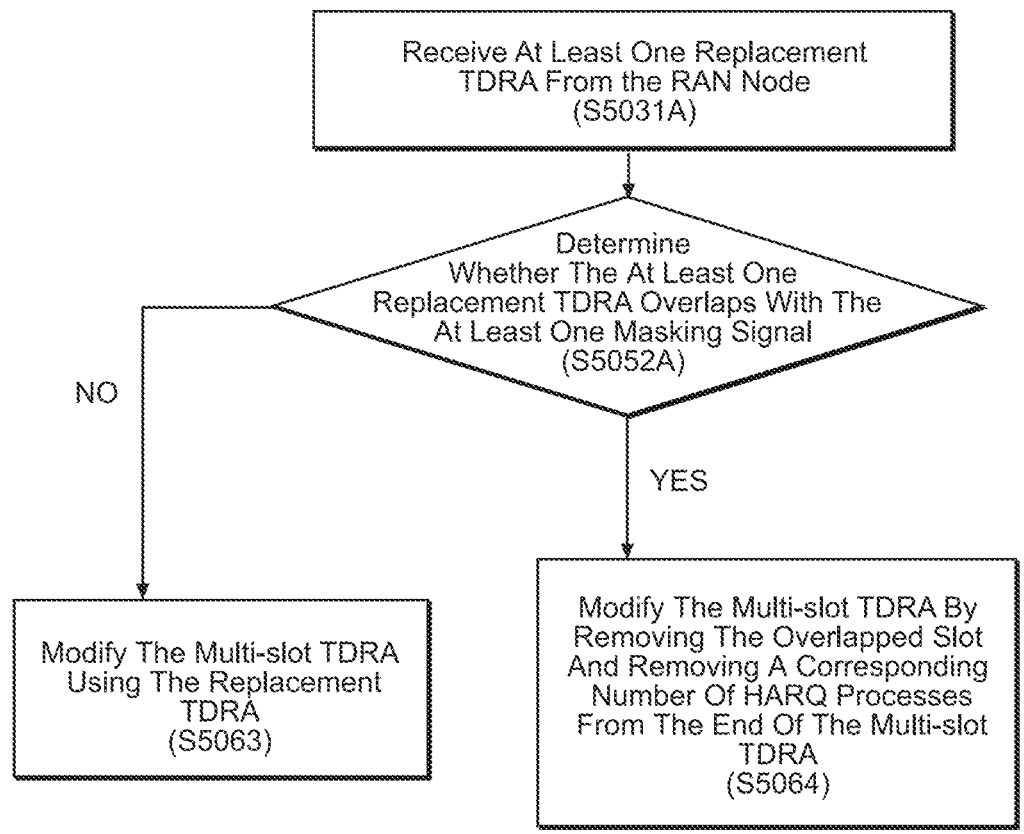

FIGS. 4C and 4D illustrate additional examples of masking signals overlapping with a multi-slot TDRAs according to some example embodiments. FIG. 5C is an example flowchart illustrating a first method of modifying an initial multi-TDRA according to some example embodiments.

Referring now to FIGS. 4C, 4D, and 5C, according to some example embodiments, in operation S5031A, the UE device 120 may receive at least one replacement TDRA from the RAN node 110 via RRC signaling, but the example embodiments are not limited thereto. For example, according to some example embodiments the UE device 120 may receive a plurality of replacement TDRAs prior to receiving and/or transmitting the at least one masking signal (e.g., masking signal A in FIG. 4C, masking signal B in FIG. 4D, etc.), and/or the replacement TDRAs may be received prior to the UE device 120 performing multi-slot UL and/or DL communication with the RAN node 110, but the example embodiments are not limited thereto. Additionally, according to some example embodiments, the initially configured TDRA table 4000 may include rows including replacement TDRAs, etc., but the example embodiments are not limited thereto. According to some example embodiments, a replacement TDRA may be an individual TDRA (e.g., a TDRA for a single slot, a TDRA for a single OFDM symbol, etc.), which may be used by the UE device 120 to replace an individual TDRA in the initial multi-TDRA which is overlapped and/or conflicts by the at least one masking signal. As shown in FIGS. 4C and 4D, the replacement TDRA (e.g., SLIVN and SLIVM) may be shorter than the allocation indicated by the SLIV that it is replacing (e.g., the replacement TDRA may include a number of symbols which is less than the number of symbols allocated to the original individual TDRA). For example, assuming that each individual TDRA in FIGS. 4C and 4D is allocated 14 OFDM symbols (and/or OFDM/DFT-S-OFDM symbols), the replacement TDRA SLIVN may cover symbols #2 to #13, and the replacement TDRA SLIVM may cover symbols #0 to #11, but the example embodiments are not limited thereto. Additionally, according to some example embodiments, if a plurality of replacement TDRAs are used, each of the replacement TDRAs may be configured for a particular masking signal type (e.g., each of the replacement TDRAs may correspond to a particular masking signal type, etc.), and the UE device 120 may select a single replacement TDRA from the plurality of replacement TDRAs based on the masking signal type indicated in the masking signal indicator, etc., but the example embodiments are not limited thereto.

According to another example embodiment, the UE device 120 may select a single replacement TDRA from the plurality of replacement TDRAs based on the overlapped individual TDRA the at least one masking signal, such that the individual replacement TDRA which has the longest set of consecutive symbols which do not conflict with the at least one masking signal is selected as the replacement TDRA. For example, as shown in FIG. 4C, if the masking signal A conflicts with the second symbol of SLIV2, then the UE device 120 selects a replacement TDRA which contains the longest set of consecutive symbols which do not conflict with the at least one masking signal A, e.g., the replacement TDRA SLIVN which covers symbols #2 to #13 (e.g., 12 consecutive symbols), but the example embodiments are not limited thereto. As a second example, as shown in FIG. 4D, the masking signal B may conflict with the thirteenth symbol of SLIV3, so the UE device 120 may select replacement TDRA SLIVM which covers symbols #0 to #11 (e.g., 12 consecutive symbols), but the example embodiments are not limited thereto, and other values and/or lengths of consecutive symbols may be used.

Referring back to FIG. 5C, in operation S5052A, after the UE device 120 determines that the initial multi-TDRA overlaps and/or conflicts with the at least one masking signal indication in operation S5051A and/or S5051B of FIG. 5B, the UE device 120 may determine whether to use the received at least one replacement TDRA to modify the initial multi-TDRA by determining whether the at least one replacement TDRA overlaps with and/or conflicts with the at least one masking signal. For example, similar to operations S5051A and S5051B of FIG. 5B, the UE device 120 may determine whether at least one slot of the replacement TDRA overlaps and/or conflicts with a scheduled slot of the at least one masking signal and/or the UE device 120 may determine whether at least one symbol allocated for the at least one masking signal overlaps and/or conflicts with the symbols indicated by the SLIV of the at least one slot of the replacement TDRA, but the example embodiments are not limited thereto. If the UE device 120 determines that the replacement TDRA (and/or the selected replacement TDRA) does not overlap and/or conflict with the at least one masking signal, the UE device performs operation S5063 and modifies the initial multi-slot TDRA by replacing the overlapped TDRA with the replacement TDRA (and/or the selected replacement TDRA), etc.

If the UE device 120 determines that the replacement TDRA (and/or the selected replacement TDRA) overlaps and/or conflicts with the at least one masking signal, the UE device 120 moves to operation S5064 and modifies the multi-slot TDRA by dropping and/or removing the overlapped slot (e.g., removing SLIV2 in FIG. 4C or removing SLIV3 in FIG. 4D) and removing a corresponding number of HARQ processes from the end of the initial multi-slot TDRA. For example, as shown in FIG. 4B, TB corresponding to SLIV2 slot may be dropped by the UE device 120, and the UE device 120 may modify the HARQ process IDs of the slots corresponding to the following SLIVs, e.g., SLIV3 and SLIV4, to use HARQ process ID 2 and 3, respectively, and removing the HARQ process from the end of the multi-slot TDRA, but the example embodiments are not limited thereto.

Figure 5D:
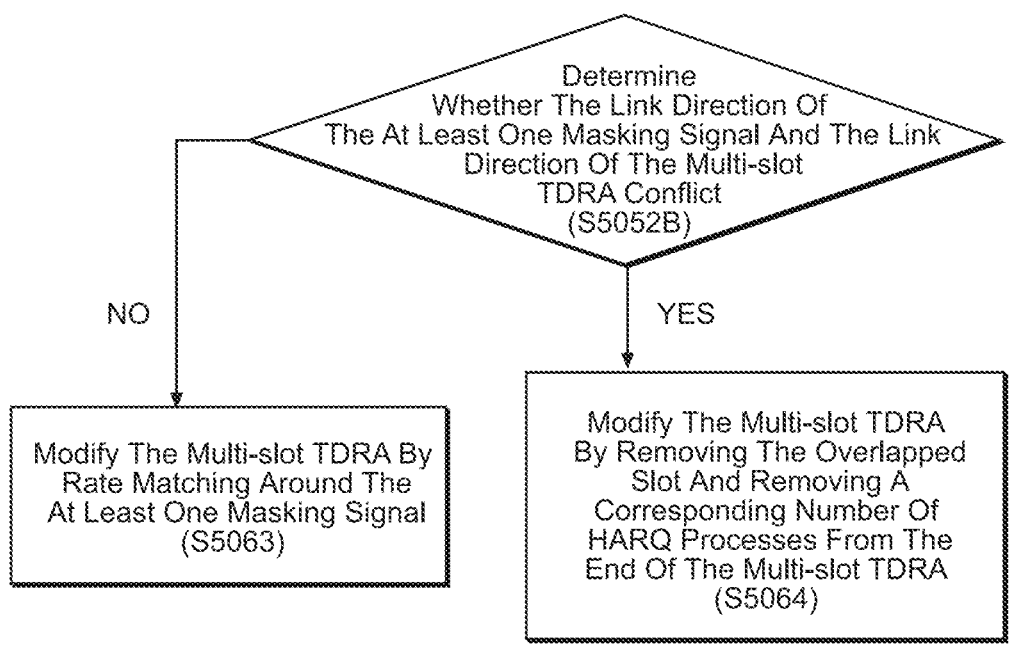
Figure 5E:
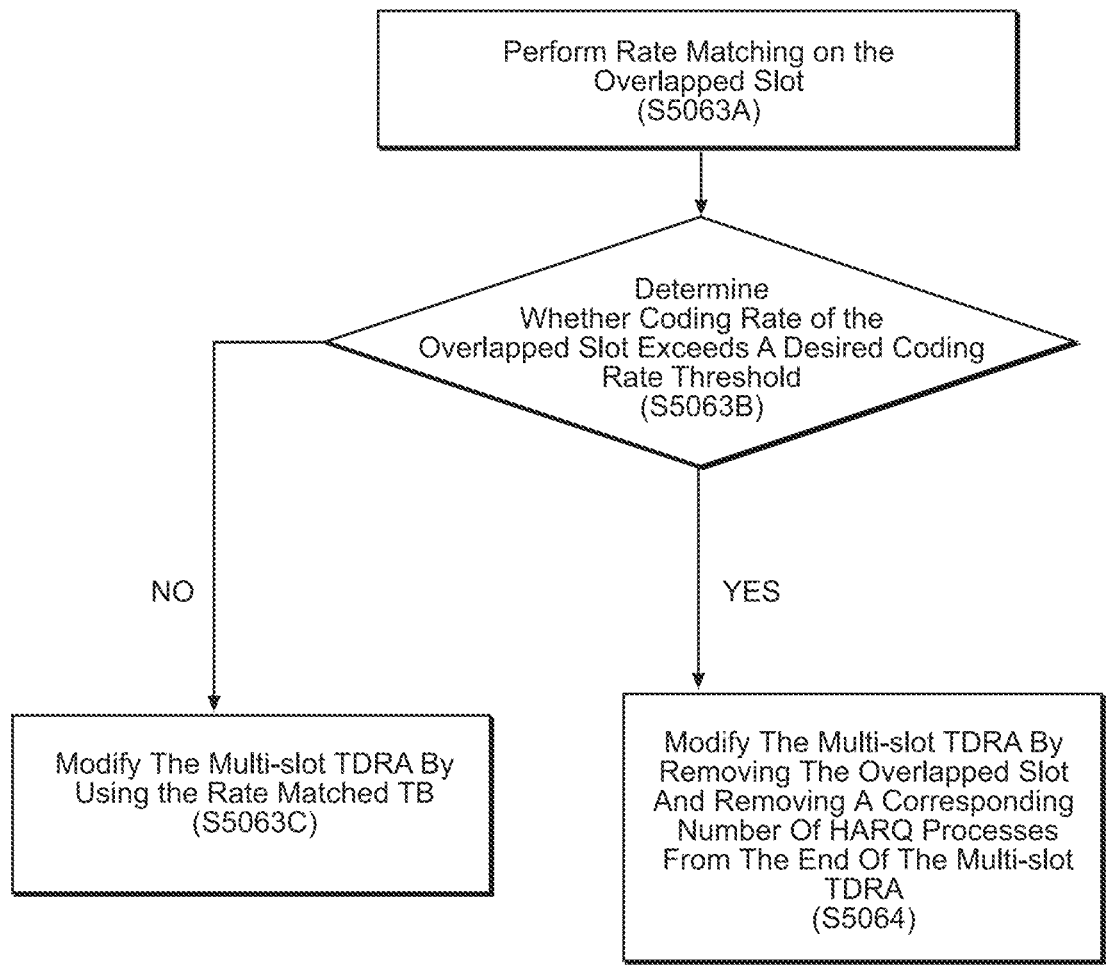

FIGS. 5D and 5E are example flowcharts illustrating additional methods of modifying an initial multi-TDRA according to some example embodiments. While FIGS. 5C, 5D, and 5E are shown as separate methods, the example embodiments are not limited thereto, and one or more of the operations of FIGS. 5C, 5D, and/or 5E, or any combinations thereof, may be used together, or may be used separately.

Referring now to FIG. 5D, FIG. 5D illustrates a second method of modifying an initial multi-TDRA based on the link directions of the multi-slot TDRA and the at least one masking signal. According to at least one example embodiment, in operation S5052B, after the UE device 120 determines that the initial multi-TDRA overlaps and/or conflicts with the at least one masking signal indication in operation S5051A and/or S5051B of FIG. 5B, the UE device 120 may determine whether to modify the initial multi-slot TDRA by determining whether the link direction of the at least one masking signal and the link direction of the multi-slot TDRA conflict. In other words, the UE device 120 compares the link direction of the initial multi-TDRA (e.g., does the initial multi-TDRA cover ULs or DLs, is the initial multi-TDRA directed towards PUSCHs or PDSCHs, etc.) with the link direction of the at least one masking signal (e.g., is the masking signal transmitted by the RAN node 110 to the UE device 120, or is the masking signal transmitted by the UE device 120 to the RAN node 110, etc.). If the link directions of the initial multi-TDRA and the at least one masking signal do not conflict, in operation S5063, the UE device 120 then modifies the multi-slot TDRA by performing rate matching around the at least one masking signal. The procedure for performing rate matching may be defined by the corresponding RAT protocol (e.g., 5G NR, etc.), or may be performed using known procedures. If the link directions of the link directions of the initial multi-TDRA and the at least one masking signal do overlap and/or conflict, then in operation S5064, the UE device 120 modifies the multi-slot TDRA by dropping and/or removing the overlapped slot and removing a corresponding number of HARQ processes from the end of the multi-slot TDRA. The comparison of the link directions as shown in FIG. 5D provides the additional benefit of avoiding cross-link interference (e.g., UL<-> DL) between multi-slot PxSCH communications and the at least one masking signal, etc.

Referring now to FIG. 5E, FIG. 5E illustrates a third method of modifying an initial multi-TDRA based on the results of the rate matching of the overlapped slot, and may be an optional continuation of the method of FIG. 5D. According to at least one example embodiment, in operation S5063A, the UE device 120 performs the rate matching on the overlapped slot of the initial TDRA. In operation S5063B, the UE device 120 then determines whether the coding rate (e.g., the information bit rate/the total bit rate) of the rate-matched overlapped slot exceeds a desired (e.g., defined, configured, etc.) coding rate threshold. For example, the desired coding rate threshold may be configured to 0.75, but the example embodiments are not limited thereto, and the desired threshold may be set via RRC signaling and/or may be defined by the wireless protocol, etc. If the coding rate of the rate matched TB does not exceed the desired threshold (e.g., 0.75, etc.), then the UE device 120 proceeds to operation S5063C and modifies the initial multi-slot TDRA by using the rate matched TB, etc. If the coding rate of the rate matched TB exceeds the desired threshold (e.g., 0.75, etc.) then the UE device 120 proceeds to operation S5064 and drops and/or removes the overlapped slot and removes a corresponding number of HARQ processes from the end of the initial multi-slot TDRA.

Figure 6:
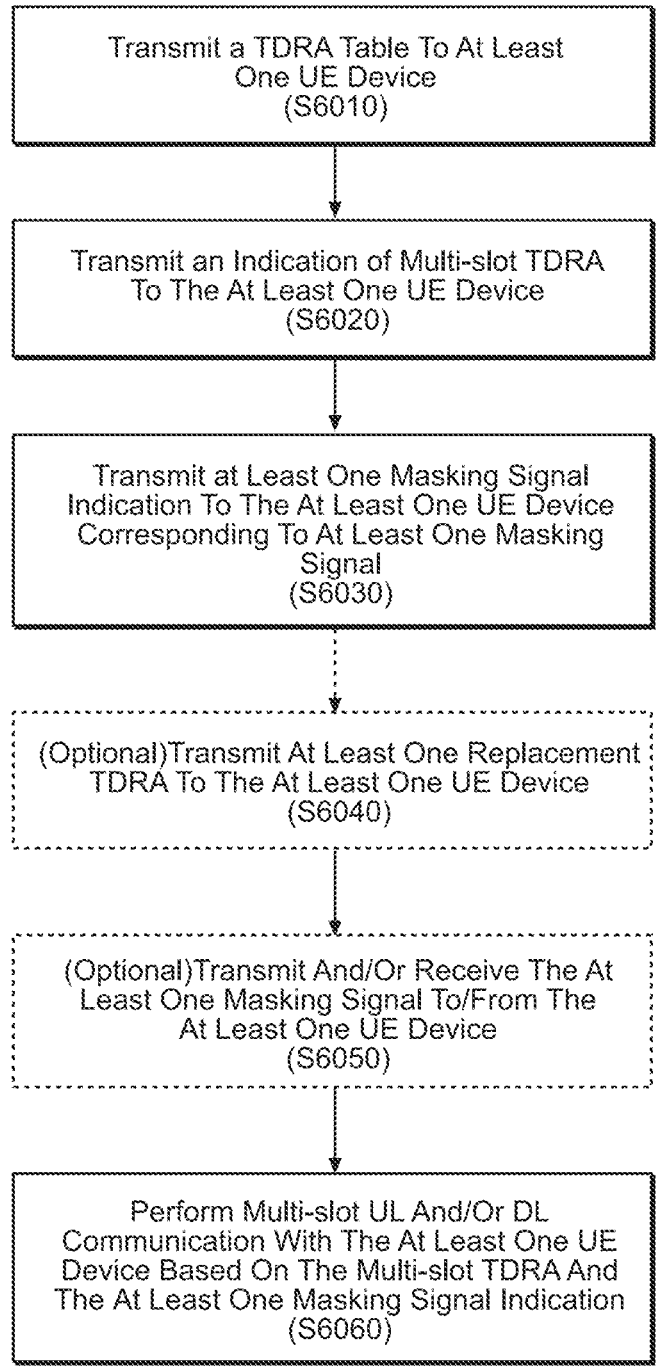
FIG. 6 is an example flowchart illustrating a method of operating a RAN node according to at least one example embodiment.

FIG. 6 is an example flowchart illustrating a method of operating a RAN node according to at least one example embodiment. In operation S6010, the RAN node 110 may transmit a TDRA table to at least one UE device, such as UE device 120, but is not limited thereto. In operation S6020, the RAN node 110 may transmit an indication of a multi-slot TDRA to the at least one UE device 120. For example, the multi-slot TDRA indication may include an indicator and/or reference to at least one row of the previously configured TDRA table, thereby signaling to and/or causing the UE device 120 to use the multi-slot TDRA configuration information associated with that row of the TDRA table, etc., but the example embodiments are not limited thereto. In operation S6030, the RAN node 110 may transmit at least one masking signal indication to the at least one UE device 120, wherein the masking signal indication corresponds to at least one masking signal, etc. In optional operation S6040, the RAN node 110 may transmit at least one replacement TDRA to the at least one UE device 120, but the example embodiments are not limited thereto. Further, in optional operation S6050, the RAN node 110 may transmit and/or receive at least one masking signal to and/or from the at least one UE device, however, the example embodiments are not limited thereto, and for example, the UE device 120 may neither transmit or receive and the slot indicated for the masking signal may be a desired slot for use by other UE devices and/or the RAN node 110, etc. For example, the designated slot for the masking signal may be used by other UE devices to transmit PRACH to the RAN node 110, but the example embodiments are not limited thereto. Finally, in operation S6060, the RAN node 110 may perform multi-slot communication, e.g., UL and/or DL communication, with the at least one UE device 120 based on the multi-slot TDRA and the at least one masking signal indication, but is not limited thereto.

Various example embodiments provide enhancements to TDRA by enabling support for multiple-physical uplink shared channel (PUSCH) scheduling and/or multiple physical downlink shared channel (PDSCH) scheduling using a single DCI message. Consequently, the one or more example embodiments provide improved resource management by reducing the amount of signaling messages and/or processing required to allocate multiple PUSCH/PDSCH TBs to a UE device, as well as reducing the memory requirements for storing expanded TDRA tables for use with one or more methods of the example embodiments, etc.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A user equipment (UE) device comprising:
a memory storing computer readable instructions; and
processing circuitry configured to execute the computer readable instructions to cause the UE device to:

receive a time domain resource allocation (TDRA) table from a radio access network (RAN) node, the TDRA table including TDRA configuration information for at least one multi-slot TDRA, receive an indication regarding at least one multi-slot TDRA from the RAN node, receive at least one masking signal indication from the RAN node, the at least one masking signal indication including information corresponding to at least one scheduled transmission slot for at least one masking signal, receive a replacement TDRA from the RAN node, determine whether to modify the multi-slot TDRA based on the received at least one masking signal indication, modify the multi-slot TDRA using the replacement TDRA based on results of the determining whether to modify the multi-slot TDRA, and perform multi-slot communication with the RAN node based on results of the determining whether to modify the multi-slot TDRA.

2. The UE device of claim 1, wherein the TDRA table further includes a plurality of rows corresponding to individual TDRA configuration information, the individual TDRA configuration information including start and length indicator values (SLIV) information and mapping type information corresponding to the individual TDRAs of the respective row, and at least one row of the plurality of rows includes individual TDRAs for at least two contiguous time domain transmission slots; and the UE device is further caused to, perform a lookup operation on the TDRA table using the received indication, the indication identifying a row of the TDRA table.

3. The UE device of claim 1, wherein the TDRA table further includes information related to:

scheduling multiple physical uplink shared channel (PUSCHs) transmission slots;

scheduling multiple physical downlink shared channel (PDSCHs) transmission slots; or scheduling both multiple PUSCH transmission slots and multiple PDSCH transmission slots.

4. The UE device of claim 1, wherein the UE device is further caused to:

determine whether at least one transmission slot of the multi-slot TDRA overlaps with the at least one scheduled transmission slot for the at least one masking signal; and in response to the at least one transmission slot of the multi-slot TDRA overlapping the at least one scheduled transmission slot for the at least one mask signal, modify the multi-slot TDRA by, removing the overlapping transmission slot of the multi-slot TDRA, and removing a corresponding number of HARQ processes from the end of the multi-slot TDRA.

5. The UE device of claim 1, wherein the UE device is further caused to:

determine whether at least one symbol allocated for the at least one masking signal in the at least one scheduled transmission slot overlaps with at least one symbol indicated by a SLIV of the at least one slot of the multi-slot TDRA; and modify the multi-slot TDRA by changing the at least one symbol indicated by the SLIV of the overlapping multi-slot TDRA based on results of the determining whether the at least one symbol allocated for the at least one masking signal overlaps with the at least one symbol indicated by the SLIV.

6. The UE device of claim 1, wherein the UE device is further caused to:

determine a link direction of the at least one masking signal; and modify the multi-slot TDRA based on the determined link direction of the at least one masking signal conflicting with a link direction of the at least one slot of the multi-slot TDRA.

7. The UE device of claim 1, wherein the at least one masking signal indication indicates that at least one of a synchronization signal block (SSB) signal, a physical random access channel (PRACH) signal, a physical downlink control channel (PDCCH) monitoring signal, a channel state information reference signal (CSI-RS), a phase tracking reference signal (PTRS), a physical uplink control channel (PUCCH) signal, or any combinations thereof, are the at least one masking signal.

8. The UE device of claim 1, wherein the UE device is further caused to:

periodically receive the at least one masking signal indication from the RAN node, and the at least one masking signal indication includes a bitmap and each bit of the bitmap corresponding to a transmission slot or a symbol.

9. A radio access network (RAN) node comprising:

a memory storing computer readable instructions; and processing circuitry configured to execute the computer readable instructions to cause the RAN node to:

transmit a time domain resource allocation (TDRA) table to at least one user equipment (UE) device, the TDRA table including TDRA configuration information for at least one multi-slot TDRA, transmit an indication regarding at least one multi-slot TDRA to the at least one UE device, transmit at least one masking signal indication to the at least one UE device, the at least one masking signal indication including information corresponding to at least one scheduled transmission slot for at least one masking signal, transmit a replacement TDRA to the at least one UE device, perform multi-slot communication with the at least one UE device based on the at least one multi-slot TDRA, the at least one masking signal indication, and the replacement TDRA.

10. The RAN node of claim 9, wherein the TDRA table further includes information related to:

scheduling multiple physical uplink shared channel (PUSCHs) transmission slots;

scheduling multiple physical downlink shared channel (PDSCHs) transmission slots; or scheduling both multiple PUSCH transmission slots and multiple PDSCH transmission slots.

11. The RAN node of claim 9, wherein the RAN node is further caused to:

periodically transmit the at least one masking signal indication to the at least one UE device, and wherein the at least one masking signal indication includes a bitmap and each bit of the bitmap corresponds to a transmission slot or a symbol.

12. A method of operating a user equipment (UE) device, the method comprising:

receiving a time domain resource allocation (TDRA) table from a radio access network (RAN) node, the TDRA table including TDRA configuration information for at least one multi-slot TDRA;

receiving an indication regarding at least one multi-slot TDRA from the RAN node;

receiving at least one masking signal indication from the RAN node, the at least one masking signal indication including information corresponding to at least one scheduled transmission slot for at least one masking signal;

receiving a TDRA from the RAN node;

determining whether to modify the multi-slot TDRA based on the received at least one masking signal indication;

modifying the multi-slot TDRA using the replacement TDRA based on results of the determining whether to modify the multi-slot TDRA; and performing multi-slot communication with the RAN node based on results of the determining whether to modify the multi-slot TDRA.

13. The method of claim 12, wherein the TDRA table further includes a plurality of rows corresponding to individual TDRA configuration information, the individual TDRA configuration information including start and length indicator values (SLIV) information and mapping type information corresponding to the individual TDRAs of the respective row, and at least one row of the plurality of rows includes individual TDRAs for at least two contiguous time domain transmission slots; and the method further comprises, performing a lookup operation on the TDRA table using the received indication, the indication identifying a row of the TDRA table.

14. The method of claim 12, the method further comprising:

determining whether at least one transmission slot of the multi-slot TDRA overlaps with the at least one scheduled transmission slot for the at least one masking signal; and in response to the at least one transmission slot of the multi-slot TDRA overlapping the at least one scheduled transmission slot for the at least one mask signal, modifying the multi-slot TDRA by, removing the overlapping transmission slot of the multi-slot TDRA, and removing a corresponding number of HARQ processes from the end of the multi-slot TDRA.

15. The method of claim 12, the method further comprising:

determining whether at least one symbol allocated for the at least one masking signal in the at least one scheduled transmission slot overlaps with at least one symbol indicated by a SLIV of the at least one transmission slot of the multi-slot TDRA; and modifying the multi-slot TDRA by changing the at least one symbol indicated by the SLIV of the overlapping multi-slot TDRA based on results of the determining whether the at least one symbol allocated for the at least one masking signal overlaps with the at least one symbol indicated by the SLIV.

16. The method of claim 12, the method further comprising:

determining a link direction of the at least one masking signal; and modifying the multi-slot TDRA based on the determined link direction of the at least one masking signal conflicting with a link direction of the at least one slot of the multi-slot TDRA.

17. The method of claim 12, the method further comprising:

periodically receiving the at least one masking signal indication from the RAN node, and wherein the at least one masking signal indication includes a bitmap and each bit of the bitmap corresponds to a transmission slot or a symbol.

* * * * *

UNITED STATES PATENT AND TRADEMARK OFFICE
CERTIFICATE OF CORRECTION

PATENT NO. : 11,576,174 B2
APPLICATION NO. : 17/222297
DATED : February 7, 2023
INVENTOR(S) : Esa Tapani Tiirola et al.

It is certified that error appears in the above-identified patent and that said Letters Patent is hereby corrected as shown below:

In the Claims

Column 24, Line number 64, Claim number 12 should read:
12. A method of operating a user equipment (UE) device, the method comprising:
    receiving a time domain resource allocation (TDRA) table from a radio access network (RAN) node, the TDRA table including TDRA configuration information for at least one multi-slot TDRA;
    receiving an indication regarding at least one multi-slot TDRA from the RAN node;
    receiving at least one masking signal indication from the RAN node, the at least one masking signal indication including information corresponding to at least one scheduled transmission slot for at least one masking signal;
    receiving a replacement TDRA from the RAN node;
    determining whether to modify the multi-slot TDRA based on the received at least one masking signal indication;
    modifying the multi-slot TDRA using the replacement TDRA based on results of the determining whether to modify the multi-slot TDRA; and
    performing multi-slot communication with the RAN node based on results of the determining whether to modify the multi-slot TDRA.

Signed and Sealed this
Sixth Day of June, 2023

Katherine Kelly Vidal
*Director of the United States Patent and Trademark Office*